United States Patent [19]

Botros

[11] 4,089,850
[45] May 16, 1978

[54] DISAZO DYES HAVING A BENZTHIAZOLYL SUBSTITUTED PHENOL OR NAPHTHOL COUPLING COMPONENT

[75] Inventor: Raouf Botros, Beech Creek, Pa.

[73] Assignee: American Color & Chemical Corporation, Charlotte, N.C.

[21] Appl. No.: 722,205

[22] Filed: Sep. 10, 1976

[51] Int. Cl.² .................. C09B 31/14; C09B 43/00
[52] U.S. Cl. .................. 260/158; 260/146 R; 260/187; 260/304 R
[58] Field of Search ......................... 260/158

[56] References Cited

U.S. PATENT DOCUMENTS

| | | | |
|---|---|---|---|
| 2,843,581 | 7/1958 | Rait | 260/158 |
| 3,510,241 | 5/1970 | Dien | 260/158 X |

*Primary Examiner*—Charles F. Warren
*Attorney, Agent, or Firm*—Armstrong, Nikaido, Marmelstein & Kubovcik

[57] ABSTRACT

Disazo dyes containing a benzthiazolyl group and corresponding to the general formula:

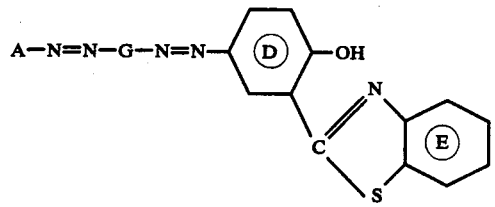

in which A and G are optionally substituted phenyl or naphthyl, D is derived from an optionally substituted salicylaldehyde or o-hydroxy-naphthaldehyde and E is derived from an optionally substituted o-aminothiophenol are provided. Metal modified polypropylene dyed with the disazo dye has excellent fastness properties.

4 Claims, No Drawings

DISAZO DYES HAVING A BENZTHIAZOLYL SUBSTITUTED PHENOL OR NAPHTHOL COUPLING COMPONENT

BACKGROUND OF THE INVENTION

1. Field of the Invention

The present invention relates to azo dyes useful in the dyeing of polyolefins and, in particular, to disazo dyes containing a benzthiazolyl group in its structure and which have utility in the dyeing of metal-modified, or metal-containing, polypropylene textile materials.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes, more particularly, chelatable dyes, having specific utility in the dyeing of such metal-containing, or metal-modified, polypropylene are reported extensively in the literature. Chelatable azo dyes disclosed for use in dyeing metallized polyolefin commonly contain o,o'-dihydroxyazo; o-hydroxy-o'-carboxyazo; o-hydroxy-o'-aminoazo; or o-carboxy-o'-aminoazo chelatable groups. Certain azomethine structures similarly substituted ortho to the —C=N— link have also been reported.

Thus, for example, Siegrist et al, U.S. Pat. No. 3,399,027, discloses a process for dyeing polyolefins containing organic nickel chelate complexes with an aqueous dispersion of an azomethine dye. As the azomethine dyes there are disclosed dyes of the formulas:

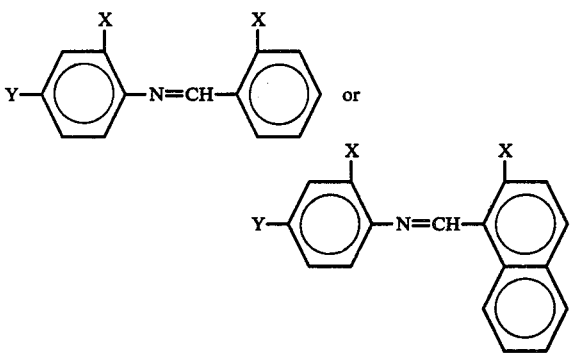

where X is OH or COOH, and Y is phenylazo or naphthylazo.

Mohr et al, U.S. Pat. No. 3,389,956, discloses the dyeing of nickel-modified polypropylene textiles with an acyl-o,o'-dihydroxyazo or acyl-o-hydroxy-o'-carboxyazo dye of the formula

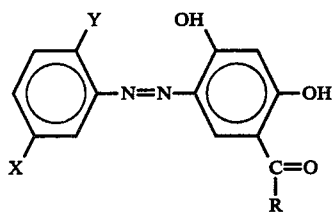

Y being hydroxy or carboxy.

Dyes having chelatable groups of the o,o'-dihydroxyazo and o-hydroxy-o'-carboxyazo type, however, do not produce acceptable shades on metallized polypropylene. Although these groups apparently bind strongly to the metal compound contained in the polypropylene and give dyeings having excellent fastness to rubbing, washing and dry cleaning, they tend to produce dull and rather weak colors. These dyes are also disadvantageous in that there is a drastic change in hue between the unchelated and chelated dyes which can cause unevenness on the metallized fiber depending on the concentration of metal throughout the fiber. This difference in hue between chelated and unchelated dyes may also cause differences in hue between the dyed pile of a carpet of a metal-containing polypropylene and the carpet backing, which is usually made from non-chelatable materials.

It is an object of the present invention, therefore, to provide dyes suitable for dyeing metal-containing, or metal-modified, polyolefins, and particularly, polypropylene, and which avoid or minimize the problems associated with the dyes heretofore employed in the art.

This and other objects of the invention will become apparent from the following summary and description of preferred embodiments.

SUMMARY OF THE INVENTION

According to the present invention chelatable disazo compounds having a benzthiazolyl group are provided which, when suitably dispersed and applied to metal-containing polypropylene fabrics, show very little change in hue between the chelated and unchelated dye and produce strong, bright shades which are exceptionally fast to light, dry cleaning and crocking.

The compounds according to the invention may be represented by the general structure (I):

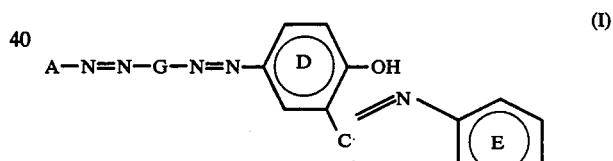

wherein

A is phenyl or naphthyl, each of which may be unsubstituted or substituted with: alkyl of 1–4 carbons; alkoxy of 1–4 carbons; nitro; cyano; halogen; trifluoromethyl; hydroxy; acyloxy; carboxy; carbalkoxy of 1–4 carbons in the alkyl moiety; acyl of 1–4 carbons in the alkyl moiety; benzoyl; acylamide, the acyl containing 1–4 carbons; benzamido; or carbamyl, the nitrogen being unsubstituted or singly or doubly substituted with lower alkyl of 1–4 carbons;

G is phenyl or naphthyl, each of which may be unsubstituted or substituted with alkyl of 1–4 carbons; alkoxy of 1–4 carbons; beta-hydroxyethyloxy; beta-cyanoethyloxy; or halogen;

D phenyl or naphthyl derived from is a salicylaldehyde or an o-hydroxy-naphthaldehyde and which may be unsubstituted or substituted with alkyl of 1–4 carbons; alkoxy of 1–4 carbons; halogen or cyano; and E derived from is an o-aminothiophenol and is unsubstituted or substituted with lower alkyl of 1–4 carbons; lower alkoxy of 1–4 carbons; nitro or halogen.

According to another embodiment of the invention there is provided metal-modified polyolefin textile material dyed with a dye of the general formula (I). The dyed polyolefin textile material has outstanding fastness properties.

Azo compounds containing a benzthiazolyl group are reported in the literature (see, for example, U.S. Pat. Nos. 3,579,498 (260-158); 3,438,964 (260-158); 3,274,171 (260-158); 3,179,650 (260-158) and 2,843,581 (260-158)). None, however, contain the phenolic hydroxyl group ortho to the benzthiazolyl group as do the compounds according to the present invention which, together with the heteronitrogen or sulfur of the benzthiazolyl group, is believed to provide a chelating site for the metal of the metal-containing polypropylene. Additionally, none are disclosed as having utility in the dyeing of a metal-containing polyolefin.

DESCRIPTION OF PREFERRED EMBODIMENTS

In the azo compounds of the general formula (I), A is a benzene or naphthalene nucleus derived from a diazotizable aromatic amine; the benzene nucleus being unsubstituted or substituted with up to three substituents and the naphthalene nucleus being unsubstituted or substituted with up to two substituents. The substituents are independently selected from alkyl of 1–4 carbons; alkoxy of 1–4 carbons; nitro; cyano; fluoro; chloro; bromo; trifluoromethyl; hydroxy; acyloxy (RCOO—, where R is alkyl of 1–4 carbons); carboxy; carbalkoxy (ROOC—, where R is alkyl of 1–4 carbons); acyl (RCO—, where R is alkyl of 1–4 carbons); benzoyl; acylamide (RCONH—, where R is alkyl of 1–4 carbons); benzamido (ArCONH—, where Ar is phenyl) and carbamyl ($H_2N$—CO—), the nitrogen of which is unsubstituted or singly or doubly substituted with alkyl of 1–4 carbons. Substitution in the benzene nucleus relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

G of the compounds (I) is a benzene or naphthalene nucleus which is unsubstituted or mono or disubstituted. The substituents may be the same or different and are selected from alkyl of 1–4 carbon atoms; alkoxy of 1–4 carbon atoms; beta-hydroxyethyloxy (—$OCH_2CH_2OH$); beta-cyanoethyloxy(—$OCH_2CH_2CN$); chloro and bromo. Substitution in the benzene nucleus will typically be in the 2-position, 3-position, 2,5-positions, or 2,3-positions. The naphthalene nucleus will typically be unsubstituted.

The member D of the compounds according to the invention is phenyl or naphthyl derived from a salicylaldehyde or an o-hydroxy-naphthaldehyde which is unsubstituted or substituted with up to two substituents independently selected from alkyl of 1–4 carbons; alkoxyl of 1–4 carbons; cyano; fluorine; chlorine and bromine.

E of the general formula (I) is derived from an o-aminothiophenol and is unsubstituted or substituted with up to two substituents independently selected from alkyl of 1–4 carbons; alkoxyl of 1–4 carbons; nitro; chloro and bromo.

As used herein alkyl designates straight or branched chain alkyl of from 1 to about 4 carbon atoms.

The disazo compounds (I) are obtained by condensing salicylaldehyde or o-hydroxy-naphthaldehyde, or their substituted derivatives, with an o-aminothiophenol to form a coupler of the formula (II):

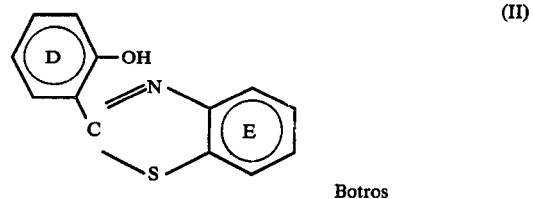

(II)

Botros wherein D and E are as defined above. An aminoazo base of the formula (III):

$$A-N=N-G-NH_2,$$ (III)

wherein A and G are as defined above, is diazotized and coupled into the coupler (II). Alternatively, the dyes may be prepared by diazotizing the aminoazo base (III) and coupling into the salicylaldehyde or the o-hydroxy-naphthaldehyde and thereafter condensing the resultant disazo compound with the o-aminothiophenol. (It is to be noted that reference hereinafter to the aminoazo base, salicylaldehyde, o-hydroxy-naphthaldehyde and 2-aminothiophenol unless otherwise specified includes the unsubstituted and substituted compounds as defined above.)

Suitable aminoazo bases (III) can be made by the rearrangement of diazoamino compounds (or triazenes) by well-established methods. Examples are p-aminoazobenzene and certain aminoazotoluenes. A general way to make the aminoazo base is to couple a diazotized aromatic amine into the same or different primary aromatic amine with an available coupling position. In certain cases, it is desirable to promote the coupling and to protect the primary amine by a group which can be removed by hydrolysis after coupling. The technique often used is the formation of the anilinomethane-sulfonic acid. Commercially available aminoazo bases coming within the definition of the formula (II), such as p-aminoazobenzene and o-tolylazo-o-toluidine, are of course suitable for preparing the dyes.

As the salicylaldehyde and o-hydroxy-naphthaldehyde suitable for preparing the disazo dyes according to the present invention there may be used any of the compounds coming within the definition of the member D of the general formula (I); substitution within the salicylaldehyde or the o-hydroxy naphthaldehyde nucleus being limited only by the availability of a suitable site in the nucleus for coupling into the diazotized amine. The unsubstituted compounds, salicylaldehyde, 1-hydroxy-2-naphthaldehyde, and 3-hydroxy-2-naphthaldehyde, are typically preferred because of their availability.

2-aminothiophenol is typically preferred as the o-aminothiophenol, again because of availability. Other o-aminothiophenols substituted according to the definition of member E of formula (I), however, may be used.

As the aromatic amines (A—$NH_2$) suitable for preparing the aminoazo base, there may be mentioned anilinecarboxylic acids, such as anthranilic acid, 5-chloro-2-aminobenzene-1-carboxylic acid, and 5-nitro-2-aminobenzene-1-carboxylic acid; hydroxy substituted amines such as 1-amino-2-hydroxybenzene, 2-hydroxy-4- or 5-nitroaniline and 2-hydroxy-5-chloroaniline; 4- nitroaniline; orthoanisidine; 3-chloro-o-toluidine; 4-nitro-3-chloro-o-toluidine; p-ethylaniline; p-butylaniline; 2-chloro-5-trifluoromethylaniline; 4-nitro-2-chloroaniline; 2,6-dichloroaniline; 2,4-dimethoxyaniline; 1-naphthylamine; 1-amino-2-naphthol- and 6-amino-2-naphthol-3-carboxylic acid; 4-nitro-1-naphthylamine; 2,4-dichloro-1-naphthylamine; 5-bromo-1-naphthylamine; 4-methoxy-1-naphthylamine and 5,7-dichloro-1-naphthylamine.

As the aromatic amines (G—NH$_2$) for preparing the aminoazo base there may be mentioned orthoanisidine; 3-chloro-o-toluidine; 2,6-dichloroaniline; 1-naphthylamine; 5-bromo-1-naphthylamine and 5,7-dichloro-1-naphthylamine and the like. The choice of aromatic amines to be employed in preparing the aminoazo base will generally be limited only by economic considerations and availability.

The starting materials employed in the working examples that follow have been found to result in dyes that provide dyeings on metal-containing polypropylene with good fastness properties. Best results appear to be obtained with dyes prepared from aromatic amines which are unsubstituted or substituted by alkyl, alkoxyl, halogen or trifluoromethyl substituents as defined above; salicylaldehyde and 2-aminothiophenol.

Condensation of the salicylaldehyde or o-hydroxynaphthaldehyde with the 2-aminothiophenol to form the coupler (II) or of the product resulting from the coupling of the diazotized aminoazo base (III) into the salicylaldehyde or the o-hydroxy-naphthaldehyde with the 2-aminothiophenol to form the disazo compounds (I) is conveniently carried out in denatured alcohol at reflux. Yields of the coupler (II) or of the disazo compound (I) of greater than 90% can be obtained by this method. Methods such as those reported by Hein et al, U.S. Pat. No. 2,985,661, and Katz, J. Am. Chem. Soc., 75, 712 (1935) may, of course be used for the condensation but yields are generally poorer.

Diszotization of the aromatic amine to form the aminoazo base and diazotization of the aminoazo base and coupling of the diazotized base into the appropriate couplers are carried out in conventional ways. Diazotization is effected by heating the aromatic amine or aminoazo base (if necessary to achieve solution) in an aqueous solution of strong mineral acid such as hydrochloric acid, cooling the resulting solution to a temperature of 0°–10° C, and adding thereto a quantity of sodium nitrite slightly in excess of the stoichiometric requirement. An alternate method of diazotization involves dissolving sodium nitrite in concentrated sulfuric acid, heating to a temperature of about 60°–70° C, cooling the resulting solution to 0°–10° C and adding thereto the aromatic amine or aminoazo base.

The coupling reaction is carried out by adding the diazonium salt to a cold aqueous alkaline solution of the respective coupler. The mixture is allowed to react until the coupling is essentially complete, usually in 1–24 hours at 0° C to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

The disazo dyes (I) of the present invention have outstanding utility in the dyeing of metal-containing polyolefins and especially, nickel-containing polypropylene fiber materials. The dyed metal-modified polypropylene fiber materials according to the present invention include as the starting polypropylene fiber material any of the conventionally produced polypropylene materials generally designated in the textile art as "polypropylene fibers", which contain Werner Complex-forming metal such as nickel, aluminum, chromium, cobalt, and zinc, either as such or in the form of its salts or chelates. The exact metal content of these fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials dyed with the structure of formula (I) have been shown to have excellent fastness properties. Such nickel-containing polypropylene materials are available commercially, for example, under the trademark HERCULON.

To prepare the dye for application to the metal-modified fiber substrates, it must be suitably dispersed. This may be done by any of several-well known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersants for powders, or water for pastes. Other materials such as preservatives, foam-control agents, and wetting agents (for powders) may be added as desired.

Dispersed pastes are made by wet milling the azo material in conventional equipment in the presence of a dispersing agent, preferably sodium lignin sulfonate or sodium alkyl -naphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5–40 percent by weight (pure color) active dye base.

Disperse powders are prepared by wet milling color in the presence of a dispersant, such as those mentioned above, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent such as sodium cetyl sulfate or alkyl aryl polyether alcohol may be added to aid in wetting out the product when it is placed in the dye bath. Disperse powders are usually cut or standardized to 10–50 percent by weight color content (pure color).

The disperse dyes may be applied to the metal-containing polypropylene fibers or fabrics in a conventional manner and may be applied, for example, as neutral, acidic, or alkaline aqueous suspensions, with the use of dispersing agents, from a dyebath, preferably at temperatures of from 50° C to 105° C. When temperatures of less than about 100° C are employed, it is sometimes advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° C and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing polypropylene carpet printed with dyes of the formula (I) show excellent fastness properties. The fabric is colored with strong, bright shades which are exceptionally fast to light, dry cleaning, crocking, gas and heat.

The invention may be better understood by referring to the working examples set forth below. In the working examples, the properties of dyed or printed polypropylene were evaluated according to the following tests:

Test No. 1: (Crocking) A crock test on an air dried sample, i.e., a portion of printed or dyed fiber, fabric or carpet construction, conducted in accordance with AATCC Test Method 8-1972 page 112 of the 1974 Technical Manual of the AATCC.

Test No 2: (Heat stability) A heat stability test determined by subjecting an air dried sample to a heat treatment of 250° F for 20 minutes. The heat treated sample is compared to an air dried sample with respect to shade change.

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 and 4L4 exposures are the lower limit of desirability in the carpet trade.

Test No. 5: (Dry cleaning) An air dried sample is tested for color fastness to dry cleaning in accordance with AATCC Test Method No. 132-1973, page 117 of the 1974 Technical Manual of the AATCC.

The invention may be better understood by referring to the examples that follow.

EXAMPLE I

A. Preparation of the Coupler

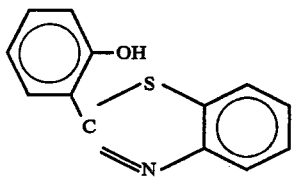

(M. W. 227)

A mixture of 50 g. o-aminothiophenol and 48.8 g salicylaldehyde was refluxed under nitrogen in 60 g. denatured alcohol for 3 hours. The reaction mixture was stirred to room temperature and filtered. The cake was washed with 300 g. denatured alcohol and was dried in an oven.

Yield: 83.6 g. — Theory: 90.8 g. (92.1%)

B. Preparation of the Disazo Compound:

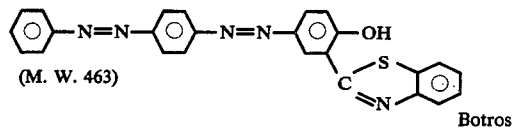

(M. W. 463)

A mixture of 39.4 g. 4-aminoazobenzene in 80 g. 32% hydrochloric acid and 450 ml. water was diazotized at 0° C with a solution of 14 g. sodium nitrite dissolved in 100 ml. water. After stirring two hours at 0° C, excess nitrous acid was destroyed with sulfamic acid and the diazo solution was clarified. A mixture of 45.4 g. 2-(o-hydroxyphenyl)benzothiazole (Part A) and 130 g. denatured alcohol was heated to complete solution, then added while still hot to a solution of 74 g. soda ash and 8 g. sodium hydroxide flakes in 1500 ml. water. Enough ice was added to bring the temperature to 0° C. The above diazo solution was then added during one hour holding the temperature at 0° C. After coupling was complete, the mixture was filtered and the cake was reslurried, without washing, into 2000 ml. water and was made acidic to Congo Red paper with hydrochloric acid. The mass was filtered and the cake was washed neutral with water. The product was obtained in 72.4% yield.

A mixture of 20 g. of the above product and 30 g. Lignosol FTA in 150 ml. water was ball-milled until dispersion test was satisfactory to yield a 10% color content paste. The dispersed product dyed nickel-containing polypropylene fibers in yellowish orange shades of excellent resistance to crocking and dry cleaning solvents. The lightfastness was outstanding. There was no break at 20 exposure hours under Xenon light.

EXAMPLE II

A. Preparation of the Disazo Intermediate:

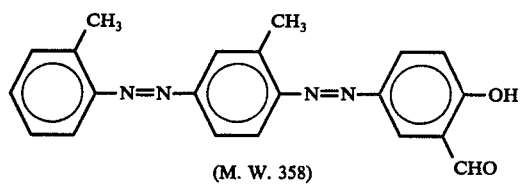

(M. W. 358)

A mixture of 101.4 g. 4-o-tolylazo-o-toluidine in 157.5 g. 32% hydrochloric acid and 900 ml. water was diazotized at 0° C with a solution of 31.5 g. sodium nitrite dissolved in 250 ml. water. After stirring 2 hours at 0° C, excess nitrous acid was destroyed with sulfamic acid and the diazo solution was clarified. The clear diazo solution was added during one hour at 0° C to a solution of 54.9 g. salicylaldehyde in 300 ml. water, 18 g. sodium hydroxide flakes and 159 g. soda ash. After coupling was complete the mixture was filtered and the cake was reslurried, without washing, into 2000 ml. water and was made acidic to Congo Red paper with hydrochloric acid. The mass was filtered and the cake was washed neutral with water. The product was dried in an oven at 80° C.

Yield: 130.7 g. — Theory: 161.1 g. (81.1%)

B. Condensation to form the Disazo Compound:

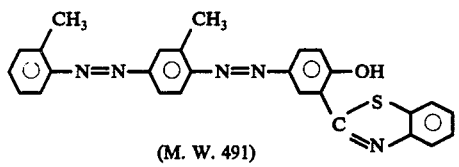

(M. W. 491)

A mixture of 17.9 g of the product obtained in (A) and 6.3 g. o-aminothiophenol was refluxed under nitrogen in 75 g. denatured alcohol for 6 hours. The reaction mixture was stirred to room temperature and filtered. The cake was washed with 100 g. denatured alcohol and was dried in an oven. The dispersed product, when printed on nickel-containing polypropylene fabrics produced bright orange shades of excellent general fastness properties especially to crocking and dry cleaning solvents. There was no break at 20 exposure hours under Xenon light.

EXAMPLE III

A. Preparation of the Disazo Intermediate:

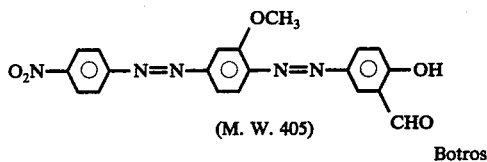

(M. W. 405)   Botros

The procedure of Example II(A) was repeated with the exception that an equivalent quantity of 4'-nitro-3-methoxy-4-aminoazobenzene was used instead of the 4-o-tolylazo-o-toluidine. The above product was obtained in 75% yield.

B. Condensation to form the Disazo Compound

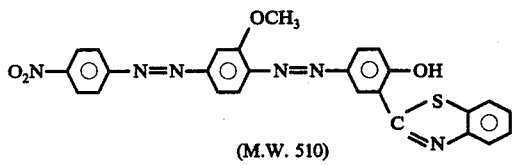

(M.W. 510)

In a substantially identical manner to that described in Example II(B), an equivalent quantity of the product obtained in (A) above was used instead of the product obtained in Example II(A). A compound having the above structure was obtained in 65% yield. The compound was suitably dispersed.

C. Dyeing of Nickel-containing Polypropylene from a Dyebath

Piece goods of "HERCULON TYPE 40" an isotactic polypropylene containing a bis(p-alkylphenol) mono sulfide nickel compound (believed to be in an amount of 0.12% calculated as metallic nickel by weight based on the weight of the polypropylene) were placed in a bath set at 35° C containing 1% Triton X-100 (iso-octyl phenyl polyethoxy ethanol) based on weight of fiber, 1-1.5% acetic acid (pH3-4) and a 1% (on weight of fiber) dispersion of the dye from Example III(B). After 5 minutes the temperature was raised to 95° C over a 30 minutes period. The dyeing was continued at 95° C for an additional 45 minutes. The piece goods were removed from the dye bath, rinsed and soaped in 0.5% soap solution at 90° C for 10 minutes. The dyed fabrics were rinsed with water and dried. They were colored in strong brown shades of excellent light fastness having outstanding resistance to crocking and dry cleaning solvents.

EXAMPLE IV

Dyeing of a Nickel-containing Polypropylene with a Printing Paste

A printing paste was prepared with 1000 parts of Tragacanth gum thickener (polysaccharides of galactose, fructose, xylose and arabinose with glucuronic acid), 5 parts acetic acid and a quantity of dispersed dyestuff corresponding to 5 to 10 parts of a pure dyestuff as obtained in Example I(B). A fabric made of fibers of polypropylene containing nickel was printed on a roller. The fabric was dried and steamed for 8 minutes at 105°-100° C. The fabric was vigorously washed in a bath of soap at 90° C. A yellowish orange shade was obtained which possessed outstanding fastness to light and crocking and excellent resistance to the chlorinated solvents used in dry cleaning.

EXAMPLES V - XXIII

Following the procedures outlined in the foregoing examples, dyes are prepared as shown in Table I which is to be read in conjunction with the general formula:

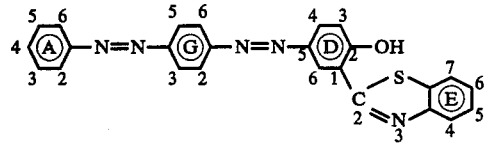

Nickel-containing polypropylene is dyed with each compound to produce dyeings having good fastness properties and having the shades indicated in the table.

TABLE I

| Ex. | Substituents on Ring A | Substituents on Ring G | Substituents on Ring D | Substituents on Ring E | Shades |
|---|---|---|---|---|---|
| V | 3-CH$_3$ | — | 4-OCH$_3$ | 6-CH$_3$ | Orange |
| VI | 3-CH$_3$ | 3-CH$_3$ | 3-C$_2$H$_5$ | 6-OCH$_3$ | Orange |
| VII | 2,4-di-CH$_3$ | 2-CH$_3$ | 3-Cl | — | Orange |
| VIII | 2,4-di-CH$_3$ | 2,5-di-CH$_3$ | 3-CN | 6-NO$_2$ | Yellowish Brown |
| IX | 4-NO$_2$ | 2-CH$_3$ | 3-F | — | Yellowish Brown |
| X | — | — | 3,4-Benz | 4,6-di-Cl | Brown |
| XI | 4-COOH | — | 4,6-di-OCH$_3$ | 5-NO$_2$ | Yellowish Orange |
| XII | 2,3-Benz | — | 3,4-di-OC$_2$H$_5$ | 6-Br | Brown |
| XIII | 4-NO$_2$ | 2,3-Benz | — | — | Reddish Brown |

TABLE I-continued

| Ex. | Substituents on Ring A | Substituents on Ring G | Substituents on Ring D | Substituents on Ring E | Shades |
|---|---|---|---|---|---|
| XIV | 4-COOC$_2$H$_5$ | — | 6-OCH$_3$ | — | Yellowish Orange |
| XX | 4-NO$_2$; 2,6-di-Cl | 2,5-di-OCH$_3$ | — | — | Yellowish Brown |
| XVI | 4-CN; 2,5-di-OCH$_3$ | 2,3-di-Cl | — | — | Yellowish Brown |
| XVII | 4-CO—C$_6$H$_5$ | — | 3-F | 6-CH$_3$ | Orange |
| XVIII | 3-NHCOCH$_3$ | 3-CH$_3$ | — | — | Orange |
| XIX | 4-NO$_2$; 2,6-di-Cl | — | 3,4-Benz | — | Brown |
| XX | 4-NHCOCH$_3$ | — | 3-Cl | 6-NO$_2$ | Orange |
| XXI | 2,3-Benz | 2,5-di-OCH$_3$ | — | — | Brown |
| XXII | 2-CF$_3$ | 2,5-di-CH$_3$ | — | — | Orange |
| XXIII | 2-COOCH$_3$ | 3-CH$_3$ | 4-OCH$_3$ | 3,6-di-Cl | Orange |

What is claimed is:

1. A disazo compound of the formula:

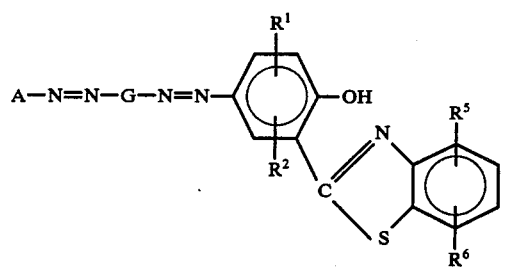

or

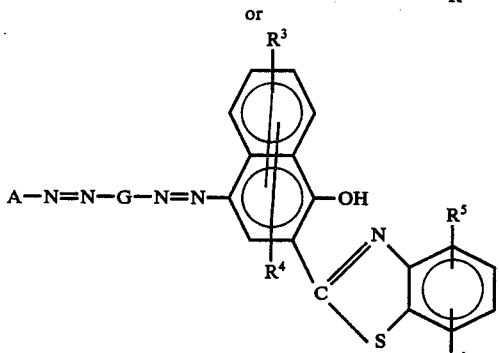

wherein:
A is phenyl which is unsubstituted or mono, di or trisubstituted, or naphthyl which is unsubstituted or mono or disubstituted, the substituents being independently selected from the group consisting of alkyl of 1-4 carbons; alkoxy of 1-4 carbons; nitro; cyano; fluoro; bromo; chloro; trifluoromethyl; hydroxy; RCOO—, where R is alkyl of 1-4 carbons; carboxy; RCO—, where R is alkyl of 1-4 carbons; benzoyl; RCONH—, where R is alkyl of 1-4 carbons; ArCONH—, where Ar is phenyl; and carbamyl, the nitrogen of which is unsubstituted or singly or doubly substituted with alkyl of 1-4 carbons;

G is phenyl or naphthyl, each of which is unsubstituted or mono or disubstituted with substituents independently selected from the group consisting of alkyl of 1-4 carbons; alkoxy of 1-4 carbons; —OCH$_2$CH$_2$OH; —OCH$_2$CH$_2$CN; chloro and bromo;

R$^1$, R$^2$, R$^3$ and R$^4$ are independently selected from the group consisting of hydrogen; alkyl of 1-4 carbons; alkoxy of 1-4 carbons; nitro; chloro and bromo; and R$^5$ and R$^6$ are independently selected from the group consisting of hydrogen; alkyl of 1-4 carbons; alkoxy of 1-4 carbons; nitro; cyano; chloro and bromo.

2. The compound of claim 1,

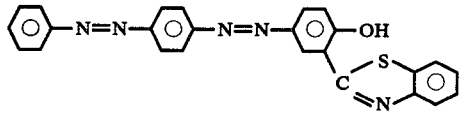

3. The compound of claim 1,

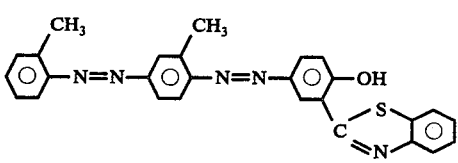

4. The compound of claim 1,

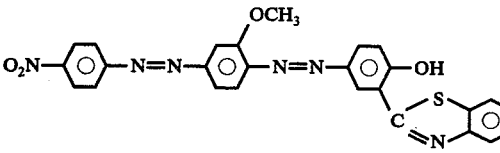

* * * * *